J. H. BYRNE.
ADVERTISING DEVICE.
APPLICATION FILED SEPT. 12, 1919.
1,373,299. Patented Mar. 29, 1921.
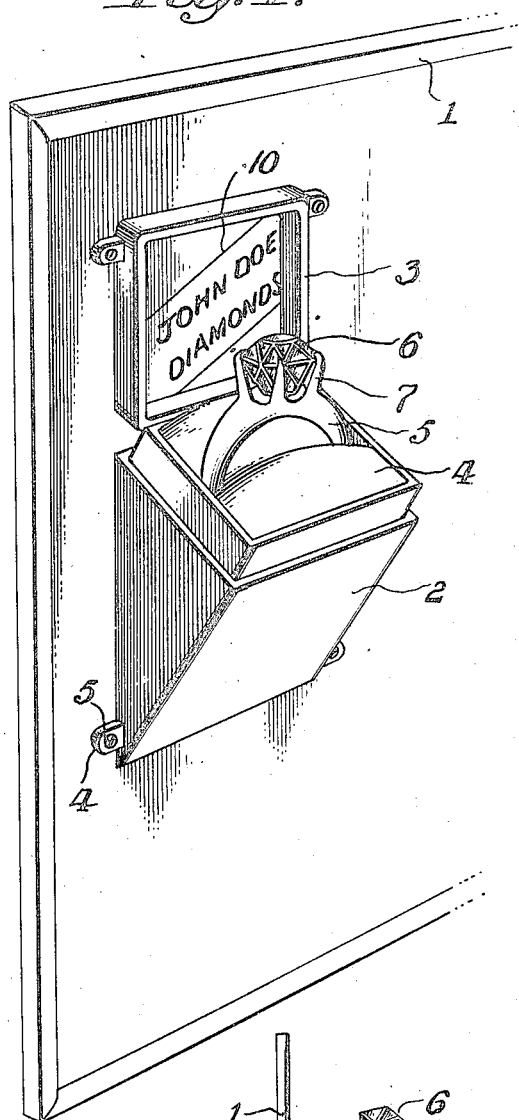
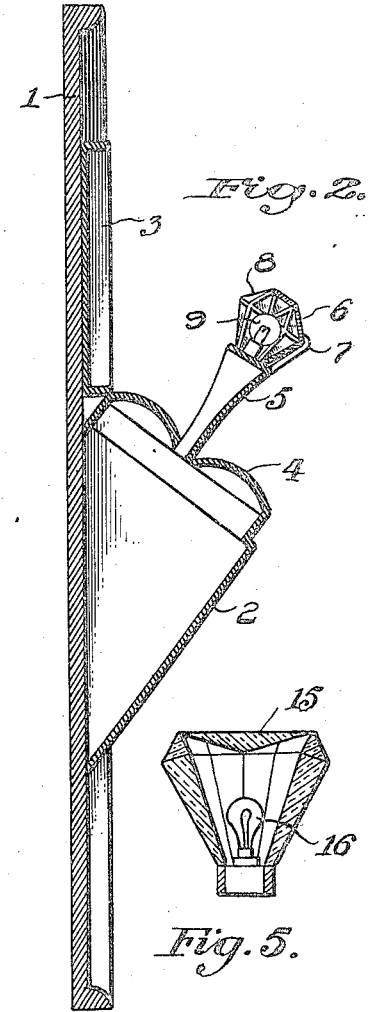
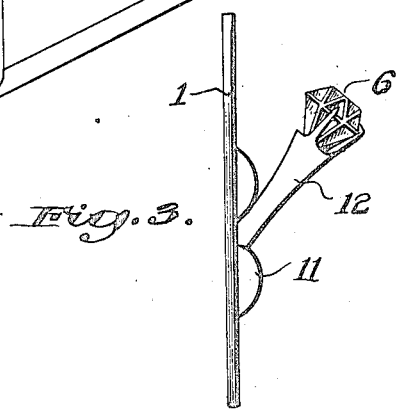
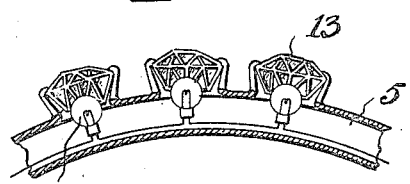
INVENTOR
Joseph H. Byrne,
BY
ATTORNEYS

UNITED STATES PATENT OFFICE.

JOSEPH H. BYRNE, OF HIGHLAND PARK, MICHIGAN.

ADVERTISING DEVICE.

1,373,299. Specification of Letters Patent. Patented Mar. 29, 1921.

Application filed September 12, 1919. Serial No. 323,298.

*To all whom it may concern:*

Be it known that I, JOSEPH H. BYRNE, a citizen of the United States of America, residing at Highland Park, in the county of Wayne and State of Michigan, have invented certain new and useful Improvements in Advertising Devices, of which the following is a specification, reference being had therein to the accompanying drawings.

This invention relates to an advertising device, and has special reference to that class of advertising intended for bill boards, walls, or structures having supporting surfaces against which the advertising device may be mounted for display purposes.

My invention aims to provide an advertising device in the form of a bas relief representing a portion of the article to be advertised and a holder for the article, and it is in this connection that the advertising device may be advantageously used by jewelers and other merchants for displaying advertisements by day or night, and it is in the latter instance that provision is made for having a portion of the article advertised illuminated also the advertisement associated with the article.

My invention further aims to provide an advertising device that may be advantageously made from sheet metal shaped to represent an article and a holder therefor, and with the pressed metal finished to represent the article and holder, it is believed that the device will attract considerable attention by day or night, especially in the latter instance as the illuminating means of the device shows the nature of the article being advertised, and consequently contributes to the display of the device when constructed upon a large scale, for instance that of an ordinary sign board.

My invention will be hereinafter more fully considered and then claimed, and reference will now be had to the drawings, wherein—

Figure 1 is a perspective view of a portion of a sign board provided with an advertising device in accordance with my invention;

Fig. 2 is a vertical sectional view of the same;

Fig. 3 is an end view of a sign board, wall or other support provided with a modified form of advertising device, Fig. 4 is a longitudinal sectional view of a portion of another form of advertising device, and Fig. 5, is a detail view of a prismatic setting.

In the drawings, the reference numeral 1 denotes a sign board, wall or other structure which serves as a support for the advertising device, which protrudes from the support, in its entirety or a portion thereof, in which instance the support is susceptible to a finish that will contribute to the display of the advertising device as a whole, or form a decorated background for a portion of the device. The advertising device, as an entirety, may be stamped and pressed from sheet metal or any material that will withstand the elements when the device is used for outdoor advertising, but when the device is used for a window or indoor display it may then be made from papier mâché or any material that may be molded, carved, embossed or otherwise formed. In the instance of adapting the advertising device to a well known business and products thereof, the advertising device as shown in Figs. 1 and 2, may be stamped and pressed from sheet metal to provide outstanding or embossed portions 2 and 3 the former representing a portion of a box or container and the latter a lid or closure for the box. The lid or closure being in an open position and in the same vertical plane as the rear edges of the portion 2, so that the portions 2 and 3 may have apertured lugs 4 so that the pressed out metallic advertising device may be connected to the sign board 1 by screws 5 or other fastening means.

The portion 2 is disposed at an acute or obtuse angle relative to the plane of the portion 3 and the outer or upper end of the portion 2 is pressed and shaped to represent a holder 4 from which protrudes a portion of an article 5 held by the holder 4, and considering the advertising device as identified with a jeweler, the portion 2 represents a ring box and in the holder 4 of said box is a ring, represented by the protruding portion 5. It may be a wedding or engagement ring and as shown the protruding portion 5 is semi-circular and has a setting 6. The setting 6 may be imitating a precious stone, and may be made hollow and of inlaid glass suitably colored in imitation of the precious stone of the ring to be advertised. The protruding portion 5 has prongs 7 in which the setting may be held and the rear side of the setting which is not exposed to view, may be open, as at 8, and the inner walls of the setting finished to serve as a reflector. Then, it is possible to place a small incandescent electric lamp 9 within the setting and have its light rays directed toward the vertical portion 3 of the advertising device. As this vertical portion represents a lid or closure for the box portion 2, the lid or closure may be provided with a suitable advertisement 10, which will be illuminated by the lamp 9 at night, and suitable connections may be made with the lamp 9 through the portion 2 so that an ordinary electric lighting circuit may be utilized as a source of energy for the electric lamp.

It is now apparent that this form of advertising device presents a realistic and attractive appearance, and will serve its purpose in the daytime, as well as at night, when it may be more attractive by reason of the setting being in an attractive color and illuminated. It is obvious that the device may be made on a very large scale for large sign boards; on a smaller scale for attachment to walls, posts and the like, or on a still smaller scale for window display.

Considering another form of the advertising device reference will be had to Fig. 3 showing a board or support 1 provided with outstanding portions 11 representing a holder for an angularly disposed or protruding portion 12, which may be constructed similar to the protruding portion 5 so as to illuminate a sign carried by the board or support 1.

In some instances it may be desired to provide the protruding portions 5 or 12, when representing a ring, with a plurality of settings, in which instance the protruding portions may be tubular material, as shown in Fig. 4, and a plurality of settings 13 illuminated by lamps 14 at said settings. It is therefore possible to illuminate practically the entire protruding portions and thus provide a brilliant luminous advertising device.

A setting for an article may be made of prisms 15, as shown in Fig. 5, and a lamp 16 with suitable colored globes employed in the setting to illuminate the same.

From the foregoing, it will be observed that many articles of jewelry, for instance a stick-pin, may be represented by an advertising device in accordance with this invention, but I do not care to confine the device entirely to the jewelry business therefore my device is susceptible to such variations and modifications as fall within the scope of the appended claims.

What I claim is:—

A jeweler's advertising device comprising a support finished to represent a portion of a box and lid, a portion extending perpendicularly from the box-like support and finished to represent an article of jewelry which is held in the box and partly concealed thereby, a setting carried by the perpendicular portion and serving as a reflector, and a lamp located in the setting and coöperating with the reflector in illuminating the box-like support.

In testimony whereof I affix my signature in the presence of two witnesses.

JOSEPH H. BYRNE.

Witnesses:
KARL H. BUTLER,
ANNA M. DORR.